3,393,093
HIGH ENERGY DENSITY BATTERY (LIFAG)
Manuel Shaw, Los Angeles, and Donald H. McClelland,
Canoga Park, Calif., assignors to Whittaker Corporation, Los Angeles, Calif., a corporation of California
No Drawing. Filed Feb. 28, 1966, Ser. No. 530,332
9 Claims. (Cl. 136—6)

ABSTRACT OF THE DISCLOSURE

A novel secondary battery comprising a negative plate selected from the group consisting of Group I, Group II and Group III metals of the periodic table, a silver difluoride positive plate, and an electrolyte therefor comprising an organic solvent selected from the group consisting of carbonyl, thiocarbonyl and cyano having dissolved therein a fluoride-containing salt.

This invention pertains to a novel high energy density secondary battery comprising a Group I, II or III metal negative plate and a silver difluoride positive plate wherein the electrolyte contains certain organic solvents and inorganic salts as more fully hereinafter described.

A wide variety of primary and secondary batteries are already known to the art. However, the requirements posed by manned space travel have rendered many known batteries unacceptable for a number of reasons. First, in space, weight must be kept to an absolute minimum. Thus, any power source, such as a battery, used in space must provide a high energy to weight ratio. Secondly, the battery must be capable of maintaining this performance over a prolonged period, and preferably should be rechargeable without drop off in performance. Many chemical couples have been suggested for use in batteries as possibly fulfilling these stringent criteria. Nevertheless, no prior system has, on balance, provided all of the needed characteristics in high degree.

Heretofore it has been suggested to use lithium as a negative plate in batteries. For example, in U.S. Patent No. 3,043,896 there is described a cell or battery consisting of a lithium negative plate in an amine electrolyte. However, this battery does not describe the use of any other organic solvents as the electrolyte. The present invention involves the use of a Group I, II or III metal negative plate combined with silver difluoride positive plate in a particular class of organic electrolytes as more fully described below. To our knowledge, this couple is completely novel and is of great significance in that it provides a novel high energy density battery.

Accordingly, it is a principal object of the present invention to provide a novel high energy density secondary battery.

More particularly, it is an object of the present invention to provide a novel secondary battery having a negative plate comprising a metal selected from the group consisting of Groups I, II or III of the Periodic Table and a silver difluoride positive plate wherein the electrolyte contains certain organic solvents and a fluoride-containing salt.

Yet another object of the present invention is to provide a novel secondary battery capable of undergoing repeated discharging and recharging.

In yet another aspect of the present invention, it is an object thereof to provide a novel secondary battery having a long storage life and good stability through repeated cycling.

These and other objects of the present invention will be apparent from the more detailed description which follows.

Briefly, the present invention comprises a secondary battery using silver difluoride as the positive plate, any metal from the Groups I, II or III of the Periodic Table as the negative plate, and an electrolyte containing a fluoride-containing salt and an organic solvent having a carbonyl, thiocarbonyl or cyano group therein.

The following example is intended merely to illustrate and not to limit the invention.

EXAMPLE

A cell was constructed of a single plate of silver difluoride and two lithium metal plates. Nylon was used as the separator. The assembly was placed in a conventional battery casing containing potassium hexafluorophosphate in propylene carbonate. The assembled cell was subjected to cycle testing for 40 cycles with a 25 ma. load. An initial plateau voltage of over 3 volts was observed. After discharge and recharging, this same voltage was again obtained. This light weight battery is thus capable of repeated cycling without major deterioration of the energy output.

The chief advantage of silver difluoride in the battery of the present invention is a theoretical voltage in excess of 4 volts and a voltage underload in excess of 3 volts per cell. In addition, the divalent nature of the silver difluoride, with the demonstration that the charge of the silver difluoride electrode proceeds to silver metal, results in a high ampere hour capacity which, together with the high voltage presents a high watt-hours per pound rating for the battery. In addition, it has been found that the silver difluoride cell is capable of serving as a high rate, high energy density secondary battery, or in other words represents a lightweight battery capable of delivering high current.

In general, the positive and negative plates of the battery of this invention are assembled in conventional fashion. This generally involves arranging alternating layers of positive plate material, separator material and negative plate material in a stacked configuration. This assembly is adapted to be received in any common battery case capable of containing the electrolyte. Obviously, any number of pairs of plates can be assembled in this manner and connected in parallel or series, to achieve the desired voltage and/or amperage output. The particular arrangement of the battery components forms no part of this invention.

While the negative plate of the present invention may be any of the metals of the Groups I, II or III of the Periodic Table, the use of lithium is preferred since it gives the highest voltage and highest possible watt-hours per pound. Various other alkali and alkaline earth metals also give very good results including calcium and potassium.

The silver difluoride plates of the present invention may contain various additives including carbon black, powdered graphite, silver powder, and mercury, as will be apparent to those skilled in the art. In general, these plates are prepared by the pasted or pressing technique. Fabrication procedure for the pasted plate involves generally first grinding the required amount of silver difluoride to a very fine powder and thereafter dry mixing various additives except the binder. Then adding a vehicle such as toluene, if used, in an amount sufficient to obtain a workable paste. The use of a binder such as polyethylene is then added and the mix is spread on a grid and dried.

The lithium plates may be prepared, for example, from 0.015 inch ribbon obtained from Foot Mineral Company. Plaques of the ribbon are cut and pressed onto grids in conventional fashion. No further preparation is necessary.

Various separator materials may be utilized including non-woven nylon and fiberglass cloth. If desired, the cell may be placed in a cell case. Ordinarily an aluminum cell case is not too practical because it tends to corrode. However, an aluminum cell case may be made suitable by coating the inside thereof with nylon, Teflon, or by wrapping the active cell components before insertion in the cell. The wrapping material can be a thin film of nylon, Teflon, or other essentially inert materials.

As has been indicated above the electrolytes to be used with the lithium-cadmium fluoride battery include mixtures of certain classes of solvents and salts.

The solvents used in the practice of our invention are those having the following functional groups.

Class I solvents:

(Carbonyl)

Class II solvents:

(Thiocarbonyl)

Class III solvents:

(Cyano)

More completely described:

Class I solvents (A) Ketones:

Compounds having the structure

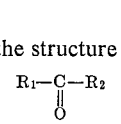

where $R_1$ or $R_2$ represent any of the alkyl groups (methyl, ethyl, propyl, butyl, amyl, etc.).
Example:

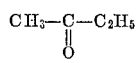

Methyl ethyl ketone (B) Esters:

Compounds having the structure

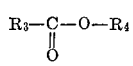

where $R_3$ and $R_4$ represent any of the alkyl groups.
Example:

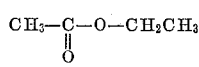

Ethyl acetate

R may also be replaced by H (hydrogen atom) to give $$H-C-O-CH_3$$
$$\|$$
$$O$$

Example:

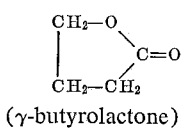

($\gamma$-butyrolactone)

(C) Carbonates:

Compounds having the structure

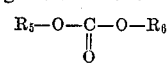

where $R_5$ and $R_6$ represent alkyl groups.

Example:

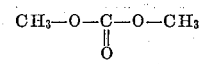

Dimethyl carbonate

Included in this group are the cyclic carbonates.
Example:

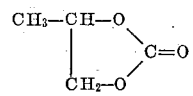

Propylene carbonate

Class II solvents (A) Sulfoxides (ketonic type):

Compounds having the structure

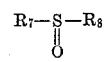

where $R_7$ and $R_8$ represent alkyl groups.
Example:

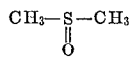

Dimethyl sulfoxide

This group also includes the cyclic oxides.
Example:

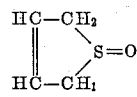

Thiophene-1-oxide (B) Sulfones (ketonic type):

Compounds having the structure

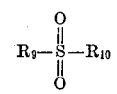

where $R_9$ and $R_{10}$ represent alkyl groups.
Example:

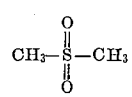

Dimethyl sulfone

This group also includes the cyclic structures.
Example:

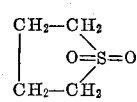

Tetrahydrothiophene, 1-1 dioxide (C) Sulfinic esters:

Compounds having the structure

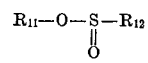

where $R_{11}$ and $R_{12}$ represent alkyl groups.

This group includes the cyclic sulfinic esters.

(D) Sulfonic esters:

Compounds having the structure

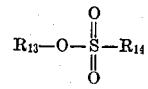

where $R_{13}$ and $R_{14}$ are alkyl.

(E) Sulfites:

Compounds having the structure

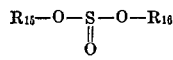

where $R_{15}$ and $R_{16}$ are alkyl.

(F) Sulfates:

Compounds having the structure

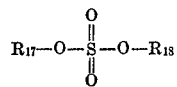

where $R_{17}$ and $R_{18}$ are alkyl.

Class III solvents

Compounds having the structure

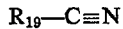

where $R_{19}$ is alkyl.

Example:

$$CH_3-C\equiv N \text{ (acetonitrile)}$$

In addition to the above mentioned solvents, the electrolyte may contain any of those types of solutes containing an atom reversible with respect to the cadmium fluoride positive plate, namely fluoride-containing compounds. These consist of the following classes of solutes.

Simple fluorides: Compounds of the type $MF_n$ where M represents any metal ion, normally from the Group I–VIII of the Periodic Table.

Examples:

$$LiF, KF, CaF_2, \text{etc.}$$

Complex fluorides may also be used including:

| | |
|---|---|
| $MPF_4$ | $M_2SF_7$ |
| $MPF_6$ | $MMgF_3$ |
| $MPOF_4$ | $M_2GeF_6$ |
| $MBF_4$ | $M_2SiF_6$ |
| $M_2BeF_4$ | $MTeF_7$ |
| $M_3AlF_6$ | $MSeF_7$ |
| $MSO_2F_6$ | $M_2ZrF_6$ |
| $M_2SF_6$ | $M_2SeF_6$ | wherein M is as defined above.

As will be immediately apparent to those skilled in the art, the battery of the present invention is characterized by excellent rechargeability, shelf life, and high energy density. Accordingly, this battery will find wide application for use in space vehicles, air planes, land vehicles, and in stationary power sources. Because of the long life of the battery, it will be found to be very economical in many applications and will permit the wider use of battery power than has been heretofore attainable.

Having fully described the invention it is intended that it be limited only by the lawful scope of the appended claims.

We claim:

1. A novel secondary battery comprising a negative plate selected from the group consisting of Group I, Group II and Group III metals of the Periodic Table, a silver difluoride positive plate and an electrolyte therefor comprising an organic solvent containing a group selected from the class consisting of carbonyl, thiocarbonyl and cyano, having dissolved therein a fluoride-containing salt.

2. The battery of claim 1 wherein a plurality of said plates are disposed in a battery case for said electrolyte.

3. The battery of claim 1 wherein the fluoride-containing salt is a simple fluoride salt.

4. The battery of claim 1 wherein the fluoride-containing salt is a complex fluoride salt.

5. The battery of claim 1 wherein the negative plate is lithium.

6. The battery of claim 1 wherein the organic solvent contains a carbonyl group and is selected from the class consisting of ketones, esters and carbonates.

7. The battery of claim 1 wherein the organic solvent contains a thiocarbonyl group and is selected from the class consisting of sulfoxides, sulfones, sulfinic esters, sulfonic esters, sulfites and sulfates.

8. A novel secondary battery comprising a negative plate selected from the group consisting of Group I, Group II and Group III metals of the periodic table, a silver difluoride positive plate, and an electrolyte therefor comprising an organic solvent which is an organic ester having dissolved therein a fluoride-containing salt.

9. A novel secondary battery comprising a negative plate selected from the group consisting of Group I, Group II and Group III metals of the periodic table, a silver difluoride positive plate, and an electrolyte therefor comprising an organic solvent which is an organic carbonate having dissolved therein a fluoride-containing salt.

References Cited

UNITED STATES PATENTS

| | | | |
|---|---|---|---|
| 3,043,896 | 7/1962 | Herbert et al. | 136—6 |
| 3,098,770 | 7/1963 | Horowitz et al. | 136—100 |
| 3,185,590 | 5/1965 | Mayer et al. | 136—6 |
| 3,279,952 | 10/1966 | Minnick | 136—83 |

WINSTON A. DOUGLAS, *Primary Examiner.*

ALLEN B. CURTIS, *Examiner.*

C. F. LeFEVOUR, *Assistant Examiner.*